(12) United States Patent
Sun et al.

(10) Patent No.: US 11,597,832 B2
(45) Date of Patent: Mar. 7, 2023

(54) BIOMIMETIC COMPOSITE MATERIAL AND PREPARATION METHOD THEREOF

(71) Applicant: ZHEJIANG A & F UNIVERSITY, Hangzhou (CN)

(72) Inventors: Qingfeng Sun, Hangzhou (CN); Yipeng Chen, Hangzhou (CN); Baokang Dang, Hangzhou (CN); Caicai Li, Hangzhou (CN); Chao Wang, Hangzhou (CN)

(73) Assignee: ZHEJIANG A & F UNIVERSITY, Hangzhou (CN)

( * ) Notice: Subject to any disclaimer, the term of this patent is extended or adjusted under 35 U.S.C. 154(b) by 207 days.

(21) Appl. No.: 16/894,915

(22) Filed: Jun. 8, 2020

(65) Prior Publication Data
US 2021/0115207 A1    Apr. 22, 2021

(30) Foreign Application Priority Data
Oct. 18, 2019  (CN) .......................... 201910994863.8

(51) Int. Cl.
  *C08J 5/24*    (2006.01)
  *C08L 63/00*   (2006.01)
  *B32B 37/02*   (2006.01)
  *B32B 21/08*   (2006.01)

(52) U.S. Cl.
  CPC .............. *C08L 63/00* (2013.01); *B32B 21/08* (2013.01); *B32B 37/02* (2013.01); *C08J 5/245* (2021.05); *B32B 2250/05* (2013.01); *B32B 2250/42* (2013.01); *B32B 2255/08* (2013.01); *B32B 2255/26* (2013.01); *C08J 2363/00* (2013.01); *C08J 2497/02* (2013.01); *C08L 2205/16* (2013.01)

(58) Field of Classification Search
  CPC .. C08J 5/24; C08L 63/00; B32B 37/02; B32B 21/08
  USPC .......................................................... 428/215
  See application file for complete search history.

(56) References Cited

U.S. PATENT DOCUMENTS

2014/0158020 A1*   6/2014   Wegst .................. A61L 27/446
                                                    106/135.1

FOREIGN PATENT DOCUMENTS

CN            103025813 A        4/2013

OTHER PUBLICATIONS

Sun, et al., Research Progress of Nacre and Biomimetic Synthesis of Nacre-like Materials, Chemical Journal of Chinese Universities, Oct. 2011, 2231-39, vol. 32 No. 10, China Academic Journal Electronic Publishing House, China.

* cited by examiner

*Primary Examiner* — Tahseen Khan

(57) ABSTRACT

The present invention provides a biomimetic composite material, a nacreous layer-mimetic material, a biomimetic nacre material and preparation methods thereof. The biomimetic composite material comprises multiple composite film formed from biomass fibers and an inorganic nanomaterial, wherein an organic polymer material is arranged between the multiple composite film layers or in the composite base body. The invention combines a high-mechanical-performance shellfish structure with a wood fiberboard to overcome the original defects of the fiberboard, improve the fiberboard performances and endow it with new special performances, so that the prepared material has dual functions of the fiberboard and the nanomaterial at the same time.

5 Claims, 7 Drawing Sheets

BIOMIMETIC COMPOSITE MATERIAL AND PREPARATION METHOD THEREOF

RELATED APPLICATIONS

The application claims the benefit of the Chinese Patent Applications CN201910994863.8 filed Oct. 18, 2019 and CN201911255359.2 filed Dec. 9, 2019, each of which is incorporated herein by reference in its entirety.

FIELD OF THE INVENTION

The present invention relates to the field of composite materials, in particular to a biomimetic composite material and a preparation method thereof.

BACKGROUND OF THE INVENTION

During the long evolution process of nature, biological materials with perfect structural forms and unique excellent performances have been formed, such as mollusk shells, pearls, bones and teeth, all of which are examples of an inorganic-organic combination and have formed complex fine multilevel micro/nanostructures with both high mechanical performance and toughness and light weight after selection and evolution over hundreds of millions of years.

An abalone shell and a nacreous layer are typical examples. The abalone shell is mainly composed of $CaCO_3$ and a small number of biomacromolecules, and has hardness twice that of a general $CaCO_3$ crystal and toughness more than 1,000 times that of the general $CaCO_3$ crystal. These structures are obtained mainly by self-assembly of organic macromolecules (protein, polysaccharides, lipids, etc.) to provide a template, on which inorganic molecules are deposited via molecular recognition. The nacreous layer is formed by alternately laminating aragonite (calcium carbonate) 95% and a small number of organic biological polymers (protein/polysaccharide 1-5%) to constitute a brick-and-mortar like micro/nano layered structure, with its strength, modulus and toughness up to 80-170 MPa, 40-70 GPa and 1.24 $KJ \cdot m^{-2}$, respectively, especially the toughness being more than 3,000 times that of aragonite. These organic matrices have a regulating effect on the nucleation, orientation, growth, spatial form of the aragonite crystal, so that it can exhibit an extraordinary order and strength at a nano-level.

The microstructure of a material determines its macro-mechanical performance. Because of the special organic-inorganic micro/nano multilayer structures, the mollusk shells are endowed with such good mechanical strength and toughness. Under an external force, the alternate arrangement of hard aragonite can deflect the stress, and meanwhile the sacrificial bonds formed at a molecular level within the biological polymers and between the biological polymers and inorganic salts can transfer the stress and consume energy. The organic/inorganic layered structure of the nacreous layer endows it an exquisite structure and unique mechanical performance. As a result, it has become a cross-discipline research focus of chemistry, material science, bioscience, nanotechnology and the like to realize biomimetic preparation of multiscale ordered inorganic or organic/inorganic hybrid materials by an environment-friendly method and exhibit multiple microscopic and macroscopic functions.

According to reports, a method for preparing artificial nacre in prior arts includes constructing a chitosan framework with a preset layered structure by a freezing-induced assembly process; subjecting the chitosan framework to acetylation to form a stable β-chitin framework so as to avoid undesired swelling and dissolving; decomposing calcium hydrogen carbonate solution constantly flowing through the organic framework in the presence of polyacrylic acid and magnesium ions in a circulating system driven by a peristaltic pump, to deposit calcium carbonate and realize in-situ mineralization growth; and impregnating the mineralization material with fibroin solution and hot pressing to obtain the artificial nacre. However, it takes about 7-10 days for mineralization, so the method is low in efficiency. Moreover, the prepared material has high inorganic matter content and density, which restrict its application.

Wood fibers are a natural renewable biomass resource with rich sources, low price and high specific strength, and wood fiber-based composite materials prepared from them have found wide application in building decoration and furniture. However, at present, the prepared wood fiber composite materials generally have a problem of poor mechanical strength or use of formaldehyde adhesive, which on one hand limits their application, on the other hand exerts an impact on the health of people due to the use of formaldehyde in application.

In addition, the defects of fiberboards such as poor mechanical performance and swelling upon moisture absorption will incur a decrease in the dimensional stability of wood, bacterial erosion, and organic contamination, so that they will lose surface colors, suffer from severe surface deterioration under ultraviolet irradiation, and become flammable at a high temperature or in case of a fire source. All these greatly limit the application range and field of the fiberboards. In order to solve these problems, it is necessary to find other ways. With the development of fiberboard functional improvement technology, especially cross-fusion of the artificial boards with nanotechnology and biomimetic technology, it is one of the high and new technologies increasingly valued in the fiberboard field to prepare high value-added multifunctional composite novel structured materials.

OBJECTS AND SUMMARY OF THE INVENTION

Through abundant experimental studies, the inventor of the present invention has found that the combination of high-mechanical-performance mollusk shell structures with wood fiberboards can overcome the original defects of the fiberboards to improve fiberboard performances and endow the fiberboards with new special performances, so that the prepared material has dual functions of the fiberboard and the nanomaterial at the same time, which is important for improvement in the fiberboard functions.

For this purpose, according to a first aspect, the present invention provides a biomimetic composite material. The biomimetic composite material comprises multiple composite film layers or a composite base body formed from biomass fibers and an inorganic nanomaterial, and an organic polymer material is arranged between the multiple composite film layers or in the composite base body.

According to the biomimetic composite material provided in the present invention, the mass ratio of the biomass fibers to the inorganic nanomaterial is 100:1-10, preferably 100: 4-6.

According to the biomimetic composite material provided in the present invention, the organic polymer material accounts for 1-10 wt %, preferably 4-5 wt %, of the biomimetic composite material.

According to the biomimetic composite material provided in the present invention, the biomass fibers may come from wood fibers, bamboo fibers, rice straws, wheat straws, corn stalks, cotton stalks, bagasse, reeds, and/or Chinese silver grass.

The inorganic nanomaterial can be selected from $CaCO_3$, $TiO_2$, ZnO, Ag, $SiO_2$, $Al_2O_3$, $Fe_3O_4$, $Mg(OH)_2$, $Al(OH)_3$, boron nitride, graphene, graphene oxide, nano montmorillonite, nano flaky calcium phosphate, nano mica sheets, carbon fibers and/or carbon nanotubes.

The organic polymer material can be selected from polyvinyl alcohol, polylactic acid, polyethylene, polypropylene, polyvinyl chloride, p-phenylenediamine, acrylic resin, polyetherimide, chitosan, and/or polyester, such as polymethyl methacrylate and thermoplastic polyurethane elastomer.

According to a second aspect, the present invention provides a preparation method of a biomimetic composite material. The method includes (1) grinding to combine an inorganic nanomaterial with biomass fibers to form composite film layers or a composite base body; (2) alternately laminating organic polymer films between the multiple composite film layers, or impregnating the composite base body with an organic polymer material; and (3) hot pressing.

According to the preparation method of the biomimetic composite material provided in the present invention, the step (1) includes adding the biomass fibers and the inorganic nanomaterial into water, stirring, and grinding to form suspension; and performing suction filtration on the suspension to form composite film layers and prepressing for drying, or freeze-drying the suspension, to form the composite base body. The mass ratio of the biomass fibers to water in the suspension is 1:10-100, preferably 1:20-50.

The preparation method of the biomimetic composite material in the present invention is implemented in two embodiments.

In one embodiment, the composite film layers comprising the inorganic nanomaterial and the biomass fibers are obtained through the step (1); the composite film layers and the organic polymer films are alternately laminated at a number ratio of about 1:1, with the total layer number of 10-100, preferably 20-50, in the step (2); and hot pressing is performed in the step (3) under the conditions of 180-260° C., 5-20 MPa and 5-15 min. The thicknesses of the composite film layers can be 20-100 μm, and those of the organic polymer films can be 0.05-0.2 μm.

In the other embodiment, the composite base body comprising the inorganic nanomaterial and the biomass fibers is obtained by freeze-drying in the step (1); the organic polymer material is impregnated in the composite base body in the step (1); and hot pressing is performed in the step (3) under the conditions of 100-250° C., 0.8-20 MPa and 0.5-24 h, to obtain the biomimetic composite material.

According to a third aspect, the present invention provides a nacreous layer-mimetic material and its preparation method, for improving the mechanical strength of a biomass fiber material and expanding its application range.

The present invention provides a nacreous layer-mimetic material comprising multiple composite film layers formed from biomass fibers and an inorganic nanomaterial, wherein organic polymer films are arranged between the multiple composite film layers.

According to the nacreous layer-mimetic material provided in the present invention, a nanosheet-loaded wood fiber film is used as hard phase material, while a polymer film is employed as soft phase material, to form a nacreous layer-mimetic structure by layer-by-layer assembly. An environment-friendly high-strength wood fiber-based composite material is developed by imitating the organic-inorganic alternate layered brick-and-mortar like structure of nacre. The prepared wood fiber-based composite material has a high mechanical strength.

The total layer number of the composite film layers and the organic polymer films can be 10-100, preferably 20-50. In the nacreous layer-mimetic material provided in the present invention, the number of the composite film layers can be the same as or different from that of the organic polymer films. In one preferred embodiment, the organic polymer films are one layer more/fewer than the composite film layers and the organic polymer films and the composite film layers are alternately laminated.

In one preferred embodiment, the inorganic nanomaterial is nanosheets selected from nano flaky alumina, boron nitride, graphene oxide, nano montmorillonite, nano flaky calcium phosphate, and/or nano mica sheets.

Preferably, the organic polymer films can be polyvinyl alcohol films, polylactic acid films, polyethylene films, polypropylene films, polyvinyl chloride films and/or polyester films.

Preferably, the biomass fibers are wood fibers and/or bamboo fibers.

According to the nacreous layer-mimetic material provided in the present invention, the mass ratio of the biomass fibers to the inorganic nanomaterial is 100:1-10, preferably 100:4-6. The organic polymer material accounts for 1-10 wt %, preferable 4-6 wt %, of the nacreous layer-mimetic material.

The present invention further provides a preparation method of a nacreous layer-mimetic material. The method includes S1-1: adding biomass fibers and an inorganic nanomaterial together into water, stirring, and grinding to obtain suspension of an inorganic nanomaterial-biomass fiber composite material; S1-2: subjecting the suspension to suction filtration to obtain composite film layers, and prepressing for drying; S1-3: alternately laminating the composite film layers and organic polymer films, and prepressing to obtain a board; and S1-4: hot pressing.

In one preferred embodiment, in the step S1-1, absolutely-dry biomass fibers 20-30 g are added for per 1 L of water, the mass ratio of the inorganic nanomaterial to the biomass fibers is 1-10:100, and the grinding time is 2-8 h.

According to the preparation method of the nacreous layer-mimetic material provided in the present invention, in the step S1-2, the prepressing for drying is performed preferably at 70-100° C. under 2-5 MPa for 2-10 min, to further dry the composite film layers.

According to the preparation method of the nacreous layer-mimetic material provided in the present invention, in the step S1-3, the prepressing is performed preferably at a room temperature (e.g. 10-30° C.) under 4-6 MPa for 2-10 min, for preliminary formation of the board.

According to the preparation method of the nacreous layer-mimetic material provided in the present invention, preferably, in the step S1-3, the composite film layers and the organic polymer films are alternately laminated at a number ratio of about 1:1, with the total layer number of 20-50. The thicknesses of the composite film layers can be 20-100 μm, and those of the organic polymer films can be 0.05-0.2 μm.

According to the preparation method of the nacreous layer-mimetic material provided in the present invention, in the step S1-4, the hot pressing is performed preferably at 180-260° C. under 5-20 MPa for 5-15 min.

The nacreous layer-mimetic material and its preparation method provided in the present invention have the following advantages:
1. The inventive nacreous layer-mimetic material uses an inorganic nanomaterial-loaded biomass fiber film as hard phase material and an organic polymer film as soft phase material to form a nacreous layer-mimetic structure through layer-by-layer assembly, which effectively simulates the layered structure of nacre and can be further prepared into a nacreous layer-mimetic structure in combination with a hot-pressing densification process.
2. The present invention develops an environment-friendly high-strength wood fiber-based composite material by imitating the organic-inorganic alternate layered brick-and-mortar like structure of nacre, and the prepared wood fiber-based composite material has high mechanical strength.
3. The materials used in the present invention are nontoxic and harmless; and the preparation process involves no organic solvent or acid/alkali reagents, adopts common easy-to-operate techniques including grinding, vacuum induced suction filtration, laminating assembly and hot pressing compaction, and therefore, is simple, safe and high in operability.
4. The nacreous layer-mimetic material prepared in the present invention can be used as a load-bearing material or flame-retardant heat insulating material.

According to a fourth aspect, the present invention provides a biomimetic nacre material and its preparation method. The preparation method is easy to operate and enriches the performances of the generated biomimetic material.

The present invention provides a biomimetic nacre material, comprising a composite base body formed from biomass fibers and an inorganic nanomaterial. The composite base body contains an organic polymer material.

In one preferred embodiment, the organic polymer material is uniformly distributed in the composite base body.

According to the biomimetic nacre material provided in the present invention, the organic polymer material is preferably polymethyl methacrylate (PMMA), polyethylene (PE), polyvinyl alcohol (PVA), p-phenylenediamine, thermoplastic polyurethane elastomer rubber, acrylic resin, polyetherimide, and/or chitosan.

According to the biomimetic nacre material provided in the present invention, the inorganic nanomaterial is selected from $CaCO_3$, $TiO_2$, $ZnO$, $Ag$, $SiO_2$, $Al_2O_3$, $Fe_3O_4$, $Mg(OH)_2$, $Al(OH)_3$, graphene, carbon fibers and/or carbon nanotubes.

According to the biomimetic nacre material provided in the present invention, the biomass fibers are selected from wood fibers, bamboo fibers, rice straws, wheat straws, corn stalks, cotton stalks, bagasse, reeds, and/or Chinese silver grass.

According to the biomimetic nacre material provided in the present invention, the mass ratio of the biomass fibers to the inorganic nanomaterial is 100:1-10, preferably 100:4-6. The organic polymer material accounts for 1-10 wt %, preferably 4-6 wt %, of the biomimetic nacre material.

The present invention further provides a preparation method of a biomimetic nacre material. The method includes S2-1: hot grinding in water to uniformly attach an inorganic nanomaterial to biomass fibers, to prepare suspension of an inorganic nanomaterial-biomass fiber composite material; S2-2: freeze casting and followed by freeze-drying the suspension to generate layered nacre structure-imitating base matrix; and S2-3: soaking the organic polymer material in the base matrix, and hot pressing to obtain a wood-based nacre material.

According to the preparation method of the biomimetic nacre material provided in the present invention, in one preferred embodiment, the step S2-1 may include pulverizing the biomass fibers, and adding into water together with the inorganic nanomaterial to form the suspension, wherein the mass ratio of the biomass fibers, the inorganic nanomaterial and the water is 1:(0.0005-0.2):(5-100); and transferring the suspension to a colloid mill at a rotation speed of 2,500-3,000 rpm, treating for 5-10 h, further transferring to a disc mill at a rotation speed of 2,500-3,000 rpm, and treating for 5-10 h to obtain the suspension of the inorganic nanomaterial-biomass fiber composite material. The particle size of the suspension of the inorganic nanomaterial-biomass fiber composite material is 50-500 nm; preferably, the mass ratio of the biomass fibers, the inorganic nanomaterial and the water is 1:(0.01-0.05):(10-50); and the rotation speeds of the colloid mill and the disc mill are 2,800-2,900 rpm, and the treatment time in the colloid mill and the disc mill is 5-7 h.

According to the preparation method of the biomimetic nacre material provided in the present invention, in one preferred embodiment, the step S2-2 may include mixing the suspension prepared in the step S1-1 with mixed salt solution composed of $NaCl$, $Na_2SO_4$, $NaHCO_3$, $MgCl_2 \cdot 6H_2O$, $CaCl_2$ and $KCl$, and reacting at 40-60° C. for 36-60 h to obtain mineralized nano biomass fiber suspension; pre-cooling to 1-5° C. and freeze-casting in a liquid nitrogen environment at −196-−30° C. to obtain a block material; and freeze-drying under 10-40 Pa for 12-48 h to obtain a layered nacre structure-imitating base body. Preferably, the reaction temperature for the suspension and the mixed salt solution is 48-52° C. and the reaction time is 48 h; the pre-cooling temperature is 4° C.; and the freeze-casting temperature is −90° C., the mold for freeze-casting is made from polydimethylsiloxane, and the freeze-drying time is 24 h.

According to the preparation method of the biomimetic nacre material provided in the present invention, in one preferred embodiment, the mixed salt solution comprises 2 g/L-5 g/L NaCl, 0.05 g/L-0.2 g/L $Na_2SO_4$, 0.2 g/L-0.5 g/L $NaHCO_3$, 0.2 g/L-0.5 g/L $MgCl_2 \cdot 6H_2O$, 0.2 g/L-0.5 g/L $CaCl_2$ and 0.1 g/L-0.3 g/L KCl. In one most preferred embodiment, the mixed salt solution comprises 3.632 g/L NaCl, 0.113 g/L $Na_2SO_4$, 0.332 g/L $NaHCO_3$, 0.328 g/L $MgCl_2 \cdot 6H_2O$, 0.284 g/L $CaCl_2$ and 0.177 g/L KCl.

According to the preparation method of the biomimetic nacre material provided in the present invention, in one preferred embodiment, the step S2-3 may include soaking the layered nacre structure-imitating base body prepared in the step S2-2 in a liquid-state organic polymer material, and hot pressing at 100-250° C. under 0.8-20 MPa for 0.5-24 h to obtain the biomimetic nacre material. The organic polymer material is preferably polymethyl methacrylate (PMMA), polyethylene (PE) or polyvinyl alcohol. Most preferably, the hot pressing is performed at 165-170° C. under 3-6 MPa for 0.5-2 h.

The biomimetic nacre material and its preparation method provided in the present invention have the following advantages:
1. The inorganic nanomaterial in the inventive biomimetic nacre material is uniformly distributed and firmly attached to the biomass fibers, to change the structures of the biomass fibers and form a shell-imitating biomimetic layered structure. The material has a higher density under the condition of the same strength and wide application in the production field of glue-free fiberboards.

2. The present invention prepares the biomimetic nacre material by direct physical combination of the biomass fibers, the inorganic nanomaterial and the organic polymer material, without requiring polymerization reaction, which is simple in preparation process, high in operability, environment-friendly, low in energy consumption and suitable for industrial production.

3. The nanoparticles such as $CaCO_3$, $TiO_2$ and ZnO are introduced into the inventive biomimetic nacre material, to endow the material with various new functions, such as photocatalytic performance, wear resistance, antibacterial performance and magnetism, thereby broadening the application range of the composite material.

BRIEF DESCRIPTION OF FIGURES

Hereinafter, a brief introduction to the drawings required in the specific embodiments of the present invention or in prior arts will be given, so as to clearly illustrate the embodiments of the present invention or the technical solutions in prior arts. In all the drawings, similar elements or parts are generally marked by similar reference signs. Each element or part is not necessarily drawn according to the actual scale.

DETAILED DESCRIPTION OF THE EMBODIMENTS

Hereinafter, the present invention will be further described in detail in conjunction with the specific embodiments, and the examples are given only for clarifying the present invention, not for limiting the scope of the present invention.

It should be noted that, unless otherwise stated, the technical terms or scientific terms used in this application should receive the ordinary meanings as understood by those skilled in the art to which the present invention belongs.

Wood fibers used in the following examples are 40-mesh pine wood fibers with a water content of 10%, from Ningbo Dashijie Group Co., Ltd.

Example 1

A nacreous layer-mimetic material is prepared by:

S1-1: wood fiber pretreatment adding wood fibers 100 g into distilled water 4 L, stirring, adding flaky nano alumina 2.5 g, stirring, and colloid milling for 2 h to obtain wood fiber nanosheet suspension.

S1-2: wood fiber-based film formation adding the wood fiber nanosheet suspension 200 g into a vacuum suction filtration device, performing suction filtration to obtain a nanosheet-loaded wood fiber film with a diameter of 150 mm and thickness of about 0.1 mm, and prepressing at 80° C. under 2.5 MPa for 5 min.

S1-3: assembly spray-coating a thin layer of epoxy resin to the surface of the nanosheet-loaded wood fiber film, alternately laminating together with polymer films layer by layer to form a 30-layer laminate, and prepressing at a room temperature under 5 MPa for 5 min to obtain a board blank.

S1-4: hot pressing hot pressing the board blank at 180° C. under 10 MPa for 10 min.

Figure 1:
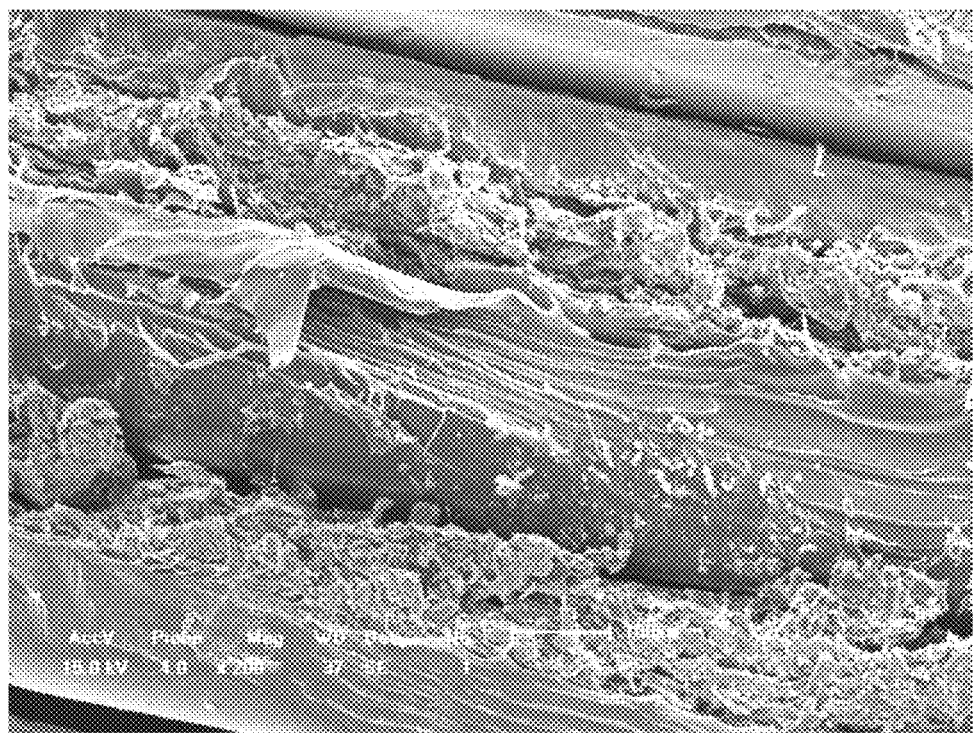
FIG. 1 is an SEM image of the nacreous layer-mimetic material prepared in Example 1 of the present invention.

FIG. 1 shows the SEM image of the nacreous layer-mimetic material prepared in this example. From FIG. 1, it can be seen that the material has a clear layered structure.

Example 2

A nacreous layer-mimetic material is prepared by:

S1-1: wood fiber pretreatment adding wood fibers 100 g into distilled water 4 L, stirring, adding nano boron nitride 5 g, stirring, and colloid milling for 6 h to obtain wood fiber nanosheet suspension.

S1-2: wood fiber-based film formation adding the wood fiber nanosheet suspension 200 g into a vacuum suction filtration device, performing suction filtration to obtain a nanosheet-loaded wood fiber film with a diameter of 150 mm and thickness of about 0.1 mm, and prepressing at 80° C. under 2.5 MPa for 5 min.

S1-3: assembly spray-coating a thin layer of epoxy resin to the surface of the nanosheet-loaded wood fiber film, alternately laminating together with polymer films layer by layer to form a 30-layer laminate, and prepressing at a room temperature under 5 MPa for 5 min to obtain a board blank.

S1-4: hot pressing hot pressing the board blank at 180° C. under 10 MPa for 10 min.

The SEM image shows that the material has a clear layered structure.

Example 3

A nacreous layer-mimetic material is prepared by:

S1-1: wood fiber pretreatment adding wood fibers 100 g into distilled water 4 L, stirring, adding nano graphene oxide 10 g, stirring, and colloid milling for 6 h to obtain wood fiber nanosheet suspension.

S1-2: wood fiber-based film formation adding the wood fiber nanosheet suspension 200 g into a vacuum suction filtration device, performing suction filtration to obtain a nanosheet-loaded wood fiber film with a diameter of 150 mm and thickness of about 0.1 mm, and prepressing at 80° C. under 2.5 MPa for 5 min.

S1-3: assembly spray-coating a thin layer of epoxy resin to the surface of the nanosheet-loaded wood fiber film, alternately laminating together with polymer films layer by layer to form a 30-layer laminate, and prepressing at a room temperature under 5 MPa for 5 min to obtain a board blank.

S1-4: hot pressing hot pressing the board blank at 180° C. under 20 MPa for 5 min.

The SEM image shows that the material has a clear layered structure.

Example 4

A nacreous layer-mimetic material is prepared by:

S1-1: wood fiber pretreatment adding wood fibers 100 g into distilled water 4 L, stirring, adding nano montmorillonite 5 g, stirring, and colloid milling for 4 h to obtain wood fiber nanosheet suspension.

S1-2: wood fiber-based film formation adding the wood fiber nanosheet suspension 200 g into a vacuum suction filtration device, performing suction filtration to obtain a nanosheet-loaded wood fiber film with a diameter of 150 mm and thickness of about 0.1 mm, and prepressing at 80° C. under 2.5 MPa for 5 min.

S1-3: assembly spray-coating a thin layer of epoxy resin to the surface of the nanosheet-loaded wood fiber film, alternately laminating together with polymer films layer by layer to form a 30-layer laminate, and prepressing at a room temperature under 5 MPa for 5 min to obtain a board blank.

S1-4: hot pressing hot pressing the board blank at 200° C. under 5 MPa for 15 min.

The SEM image shows that the material has a clear layered structure.

Example 5

A nacreous layer-mimetic material is prepared by:

S1-1: wood fiber pretreatment adding wood fibers 100 g into distilled water 4 L, stirring, adding flaky nano calcium phosphate 5 g, stirring, and colloid milling for 8 h to obtain wood fiber nanosheet suspension.

S1-2: wood fiber-based film formation adding the wood fiber nanosheet suspension 200 g into a vacuum suction filtration device, performing suction filtration to obtain a nanosheet-loaded wood fiber film with a diameter of 150 mm and thickness of about 0.1 mm, and prepressing at 80° C. under 2.5 MPa for 5 min.

S1-3: assembly spray-coating a thin layer of epoxy resin to the surface of the nanosheet-loaded wood fiber film, alternately laminating together with polymer films layer by layer to form a 30-layer laminate, and prepressing at a room temperature under 5 MPa for 5 min to obtain a board blank.

S1-4: hot pressing hot pressing the board blank at 220° C. under 10 MPa for 10 min.

The SEM image shows that the material has a clear layered structure.

Example 6

A nacreous layer-mimetic material is prepared by:

S1-1: wood fiber pretreatment adding wood fibers 100 g into distilled water 4 L, stirring, adding nano mica sheets 10 g, stirring, and colloid milling for 8 h to obtain wood fiber nanosheet suspension.

S1-2: wood fiber-based film formation adding the wood fiber nanosheet suspension 200 g into a vacuum suction filtration device, performing suction filtration to obtain a nanosheet-loaded wood fiber film with a diameter of 150 mm and thickness of about 0.1 mm, and prepressing at 80° C. under 2.5 MPa for 5 min.

S1-3: assembly spray-coating a thin layer of epoxy resin to the surface of the nanosheet-loaded wood fiber film, alternately laminating together with polymer films layer by layer to form a 30-layer laminate, and prepressing at a room temperature under 5 MPa for 5 min to obtain a board blank.

S1-4: hot pressing hot pressing the board blank at 220° C. under 20 MPa for 15 min.

The SEM image shows that the material has a clear layered structure.

Performance Test

The physical mechanical performances of the boards prepared in Examples 1-6 and common fiberboards are tested in reference to the national standard GB/T 17657-2013 Test Methods of Evaluating the Properties of Wood-Based Panels and Surface Decorated Wood-based Panels. The test results are shown in Table 1.

TABLE 1

| Test items | Fiberboard | Example 1 | Example 2 | Example 3 | Example 4 | Example 5 | Example 6 |
|---|---|---|---|---|---|---|---|
| Density (g/cm$^3$) | 0.8 | 1.04 | 1.14 | 1.20 | 1.01 | 1.19 | 1.24 |
| Static bending strength (MPa) | 25 | 48.41 | 67.41 | 58.60 | 52.60 | 56.60 | 61.60 |
| Modulus (MPa) | 2500 | 4390 | 5720 | 5800 | 4800 | 5500 | 6000 |

As shown in Table 1, all the materials prepared in Examples 1-6 have densities higher than that of a common fiberboard, and have greatly-improved mechanical strength. The density and mechanical performance of the inventive materials can be adjusted by adjusting the amounts and kinds of the nanoparticles added. Moreover, the material prepared in Example 2 exhibits excellent mechanical performance under the condition of low density.

Example 7

A biomimetic nacre material is prepared from wood fibers by the following steps:
- S1: pulverizing the wood fibers, and dissolving in distilled water together with nano $CaCO_3$ to form suspension, wherein the mass ratio of the wood fibers, the nano $CaCO_3$ and the distilled water is $1:5\times10^{-4}:20$; and colloid milling at 2,500 rpm for 10 h, and further treating in a disc mill at 2,500 rpm for 10 h to obtain nanomaterial-wood fiber composite suspension with a particle size of 50-500 nm;
- S2: mixing the nano suspension with mixed salt solution composed of 3.632 g/L NaCl, 0.113 g/L $Na_2SO_4$, 0.332 g/L $NaHCO_3$, 0.328 g/L $MgCl_2.6H_2O$, 0.284 g/L $CaCl_2$) and 0.177 g/L KCl, reacting at 40° C. for 60 h to obtain mineralized nano wood fiber suspension, pre-cooling to 1° C., freeze-casting in a liquid nitrogen environment at −196° C., and freeze-drying at −30-20° C. (the temperature gradually rises during the freeze-drying process, the same below) under 40 Pa for 24 h to obtain a layered nacre structure-imitating base body;
- S3: soaking organic polymer PMMA in the suspension of the layered nacre structure-imitating base body obtained in the step S2, and hot pressing at 100° C. under 0.8 MPa for 24 h to obtain a finished product containing the organic polymer material 1 mass %.

Example 8

A biomimetic nacre material is prepared from wood fibers by the following steps:
- S1: pulverizing the wood fibers, and dissolving in distilled water together with nano $CaCO_3$ to form suspension, wherein the mass ratio of the wood fibers, the nano $CaCO_3$ and the distilled water is 1:20:20; and colloid milling at 3,000 rpm for 5 h, and further treating in a disc mill at 3,000 rpm for 5 h to obtain nanomaterial-wood fiber composite suspension with a particle size of 50-500 nm;
- S2: mixing the nano suspension with mixed salt solution composed of 3.632 g/L NaCl, 0.113 g/L $Na_2SO_4$, 0.332 g/L $NaHCO_3$, 0.328 g/L $MgCl_2.6H_2O$, 0.284 g/L $CaCl_2$) and 0.177 g/L KCl, reacting at 60° C. for 36 h to obtain mineralized nano wood fiber suspension, pre-cooling to 5° C., freeze-casting in a liquid nitrogen environment at −30° C., and freeze-drying at −30-20° C. under 40 Pa for 36 h to obtain a layered nacre structure-imitating base body;
- S3: soaking organic polymer PMMA in the suspension of the layered nacre structure-imitating base body obtained in the step S2, and hot pressing at 250° C. under 20 MPa for 0.5 h to obtain a finished product containing the organic polymer material 10 mass %.

Example 9

A biomimetic nacre material is prepared from wood fibers by the following steps:
- S1: pulverizing the wood fibers, and dissolving in distilled water together with nano $CaCO_3$ to form suspension, wherein the mass ratio of the wood fibers, the nano $CaCO_3$ and the distilled water is 1:0.02:20; and colloid milling at 2,880 rpm for 6 h, and further treating in a disc mill at 2,880 rpm for 6 h to obtain nanomaterial-wood fiber composite suspension with a particle size of 50-500 nm;
- S2: mixing the nano suspension with mixed salt solution composed of 3.632 g/L NaCl, 0.113 g/L $Na_2SO_4$, 0.332 g/L $NaHCO_3$, 0.328 g/L $MgCl_2.6H_2O$, 0.284 g/L $CaCl_2$) and 0.177 g/L KCl, reacting at 50° C. for 48 h to obtain mineralized nano wood fiber suspension, pre-cooling to 4° C., freeze-casting in a liquid nitrogen environment at −90° C., and freeze-drying at −30-20° C. under 20 Pa for 36 h;
- S3: soaking organic polymer PMMA in the suspension of the layered nacre structure-imitating base body obtained in the step S2, and hot pressing at 168° C. under 5 MPa for 1 h to obtain a finished product containing the organic polymer material 5 mass %.

Example 10

A biomimetic nacre material is prepared from bamboo fibers by the following steps:
- S1: pulverizing the bamboo fibers, and dissolving in distilled water together with nano $SiO_2$ to form suspension, wherein the mass ratio of the bamboo fibers, the nano $SiO_2$ and the distilled water is 1:0.02:20; and colloid milling at 2,880 rpm for 6 h, and further treating in a disc mill at 2,880 rpm for 6 h to obtain nanomaterial-bamboo fiber composite suspension with a particle size of 50-500 nm;
- S2: mixing the nano suspension with mixed salt solution composed of 3.632 g/L NaCl, 0.113 g/L $Na_2SO_4$, 0.332 g/L $NaHCO_3$, 0.328 g/L $MgCl_2.6H_2O$, 0.284 g/L $CaCl_2$) and 0.177 g/L KCl, reacting at 50° C. for 48 h to obtain mineralized nano bamboo fiber suspension, pre-cooling to 4° C., freeze-casting in a liquid nitrogen environment (−90° C.), and freeze-drying at −30-20° C. under the vacuum condition of 20 Pa for 36 h; S3: soaking organic polymer PE in the suspension of the layered nacre structure-imitating base body obtained in the step S2, and hot pressing at 168° C. under 5 MPa for 1 h to obtain a finished product containing the organic polymer material 5 mass %.

Example 11

A biomimetic nacre material is prepared from rice straw fibers by the following steps:
- S1: pulverizing the rice straw fibers, and dissolving in distilled water together with nano $TiO_2$ to form suspension, wherein the mass ratio of the rice straw fibers, the nano $TiO_2$ and the distilled water is 1:0.02:20; and colloid milling at 2,880 rpm for 6 h, and further treating in a disc mill at 2,880 rpm for 6 h to obtain nanomaterial-rice straw fiber composite suspension with a particle size of 50-500 nm;
- S2: mixing the nano suspension with mixed salt solution composed of 3.632 g/L NaCl, 0.113 g/L $Na_2SO_4$, 0.332 g/L $NaHCO_3$, 0.328 g/L $MgCl_2.6H_2O$, 0.284 g/L CaCl$_2$) and 0.177 g/L KCl, reacting at 50° C. for 48 h to obtain mineralized nano rice straw fiber suspension, pre-cooling to 4° C., freeze-casting in a liquid nitrogen environment (−120° C.), and freeze-drying at −30-20° C. under 20 Pa for 36 h;

S3: soaking organic polymer PVA in the suspension of the layered nacre structure-imitating base body obtained in the step S2, and hot pressing at 168° C. under 5 MPa for 1 h to obtain a finished product containing the organic polymer material 5 mass %.

Example 12

A biomimetic nacre material is prepared from bagasse fibers by the following steps:

S1: pulverizing the bagasse fibers, and dissolving in distilled water together with nano Fe$_3$O$_4$ to form suspension, wherein the mass ratio of the bagasse fibers, the nano Fe$_3$O$_4$ and the distilled water is 1:0.02:20; and colloid milling at 2,880 rpm for 6 h, and further treating in a disc mill at 2,880 rpm for 6 h to obtain nanomaterial-bagasse fiber composite suspension with a particle size of 50-500 nm;

S2: mixing the nano suspension with mixed salt solution composed of 3.632 g/L NaCl, 0.113 g/L Na$_2$SO$_4$, 0.332 g/L NaHCO$_3$, 0.328 g/L MgCl$_2$.6H$_2$O, 0.284 g/L CaCl$_2$) and 0.177 g/L KCl, reacting at 50° C. for 48 h to obtain mineralized nano bagasse fiber suspension, pre-cooling to 4° C., freeze-casting in a liquid nitrogen environment (−150° C.), and freeze-drying at −30-20° C. under the vacuum condition of 20 Pa for 36 h;

S3: soaking organic polymer PMMA in the suspension of the layered nacre structure-imitating base body obtained in the step S2, and hot pressing at 168° C. under 5 MPa for 1 h to obtain a finished product containing the organic polymer material 5 mass %.

Comparative Example 1

In this comparative example, a random CaCO$_3$/wood fiber composite board, for comparison with the inventive biomimetic nacre material, is prepared from wood fibers by the following steps:

1. Pulverizing the wood fibers, and directly mixing with nano CaCO$_3$ and organic polymer PMMA while heating, wherein the mass ratio of the wood fibers, nano CaCO$_3$ and PMMA is 1:0.02:0.05;
2. Hot pressing at 168° C. under 5 MPa for 1 h.

Characterization and Test

1. Morphological Features

Figure 2:
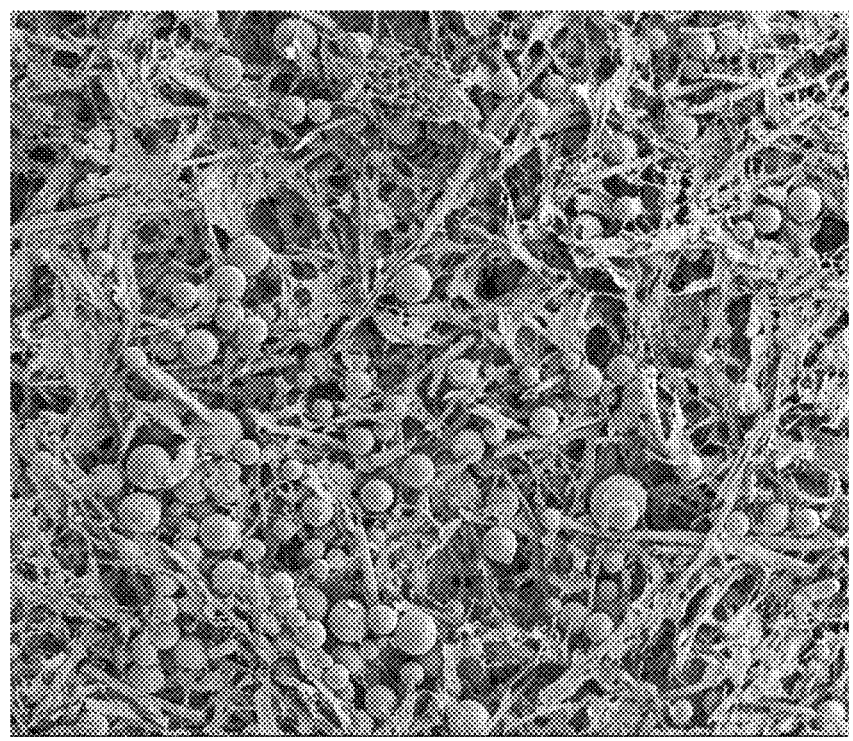
FIG. 2 is an SEM image of the biomimetic nacre material prepared in Example 9 of the present invention.

FIG. 2 is an SEM image of the CaCO$_3$/wood fiber composite material prepared in Example 9, and reflects that the wood fibers undergo a mechanical and chemical grinding stage to get split, broken and refined at a nanometer scale, and at the same time CaCO$_3$ is combined with the surfaces of the wood fibers under the actions of electrostatic adsorption and Van der Waals force.

Figure 3:
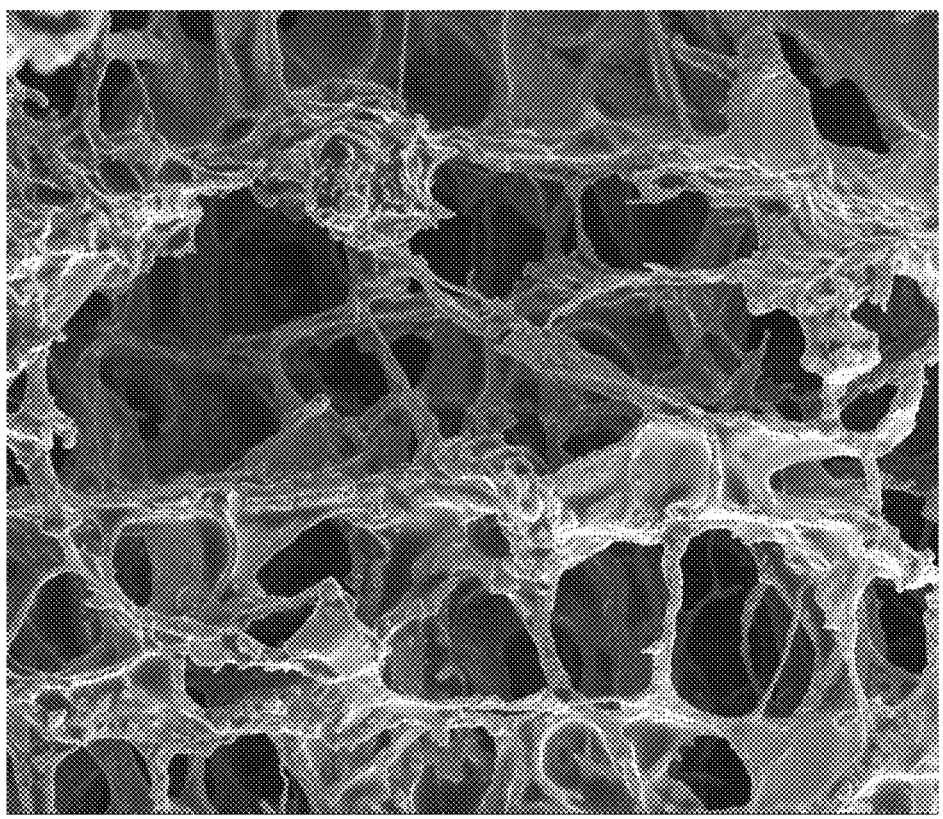
FIG. 3 is an SEM image of the layered base body of the biomimetic nacre material prepared in Example 9 of the present invention.

FIG. 3 is an SEM image of the nacre layered structure-imitating base body prepared in Example 9. During freeze-casting where an ice crystal induced assembly process is adopted, part of the CaCO$_3$/wood fiber composite material is excluded out of the ice crystals grown in layers to get sandwiched between the adjacent ice crystals, thereby forming a continuous network and having the structure determined by an ice crystal template. Finally, an ordered layered structure is formed by freeze-drying after ice crystal sublimation.

Figure 4:
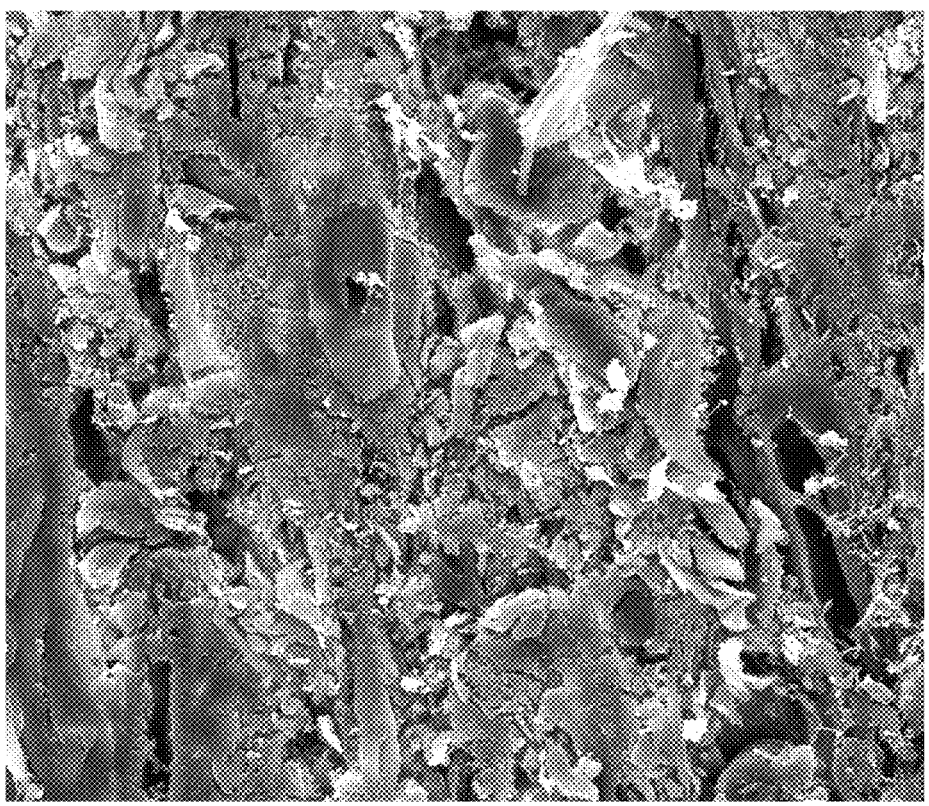
FIG. 4 is a cross-sectional SEM image of the biomimetic nacre material prepared in Example 9 of the present invention.

FIG. 4 is a cross-sectional SEM image of the biomimetic nacre material prepared in Example 9. An organic polymer soft material is filled in the ordered layered base body after freeze-drying to form a hard CaCO$_3$/wood fiber composite material-soft organic polymer laminate structure, which enables stress to transfer and dissipate between the layers in a stress process to avoid stress concentration.

The characterizations of the morphological features of the biomimetic nacre materials prepared in Examples 7, 8, 10 and 12 show the same result as that in Example 9, so no more detail is provided herein.

2. Performance Test

Figure 5:
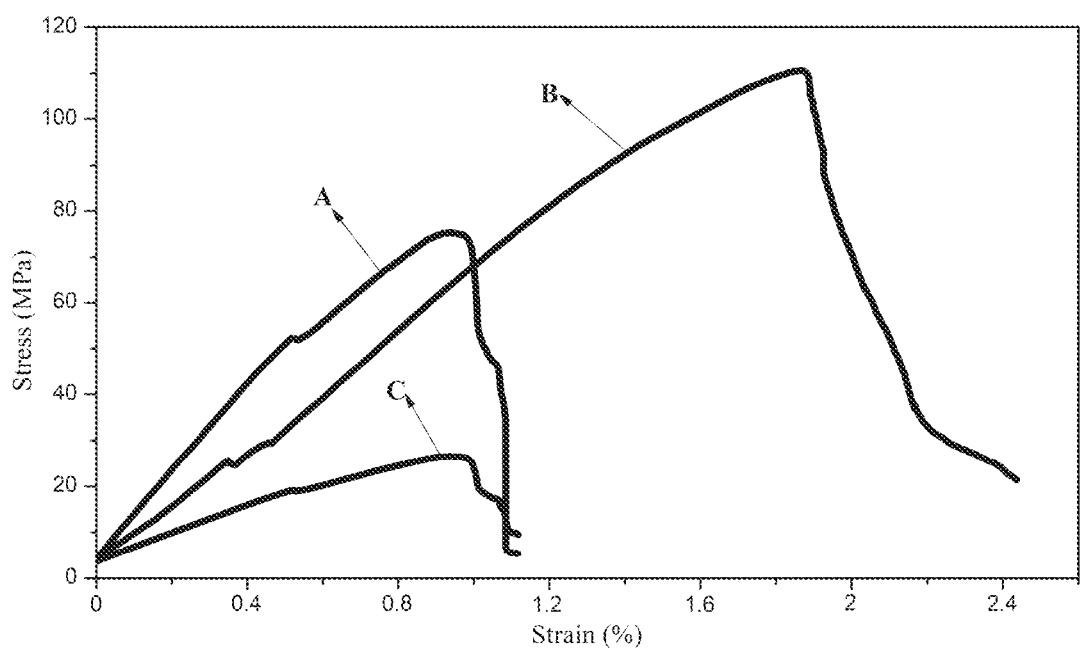
FIG. 5 is a comparison diagram of the bending stress-strain curves of the biomimetic nacre material prepared in Example 9 of the present invention and other related wood materials.

1) Bending strength: FIG. 5 is a comparison diagram of the bending stress-strain curves of the biomimetic nacre material prepared in Example 9 of the present invention and other related wood materials. In FIG. 5, Line A represents the bending stress-strain curve of a pure wood fiberboard; Line B represents the bending stress-strain curve of the biomimetic nacre material prepared in Example 9 of the present invention; and Line C represents the bending stress-strain curve of a random CaCO$_3$/wood fiber composite board (prepared in the Comparative Example 1).

From FIG. 5, it can be seen that the bending strength (Line B) of the biomimetic nacre material is higher than that (Line C) of the random CaCO$_3$/wood fiber composite board, which is higher than the bending strength (Line A) of the pure wood fiberboard. The interaction between the organic polymer and two CaCO$_3$/wood fiber composite layers plays the role in synergistic toughening of the biomimetic nacre material. If the organic polymer is absent, the CaCO$_3$/wood fiber composite layer is more likely to aggregate, and the anionic interaction between the two CaCO$_3$/wood fiber composite layers is relatively weak. In addition, the CaCO$_3$/wood fiber composite material has a high rigidity.

Figure 6:
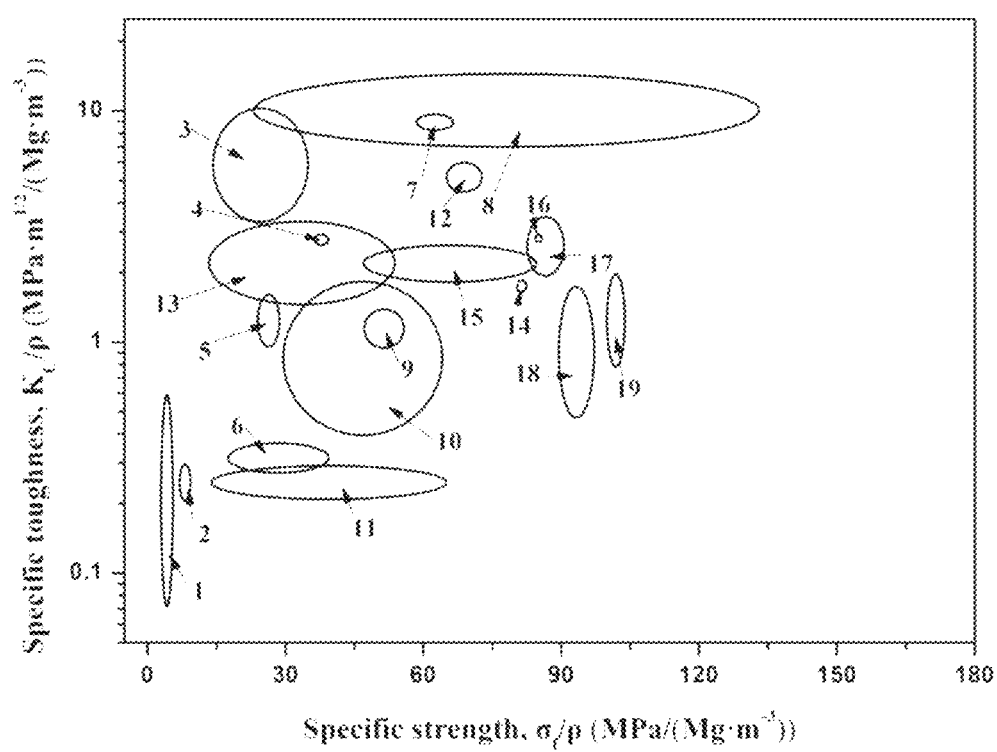
FIG. 6 is a comparison diagram of the specific strength of the biomimetic nacre material prepared in Example 9 of the present invention and other materials.

2) Specific strength: FIG. 6 is a comparison diagram of the specific strength of the biomimetic nacre material prepared in Example 9 of the present invention and other materials, wherein 1. Concrete; 2. Glass; 3. Copper alloy; 4. Natural Sinanodonta woodiana shell; 5. Synthetic shell; 6. Polyurethane; 7. Al$_2$O$_3$/polyacrylic acid composite material; 8. Aluminum alloy; 9. Polystyrene; 10. Epoxy resin; 11. Quartz glass; 12. The inventive biomimetic nacre material; 13. Ferroalloy; 14. Natural California red abalone shell; 15. Cristaria plicata shell; 16. Natural nacre; 17. Nylon; 18. Al$_2$O$_3$ material; 19. Silicon carbide material.

The comparison results of the bending strength and the specific strength between the biomimetic nacre material prepared in Examples 7, 8, 10 and 12 and other materials are similar to those in Example 9, so no more detail is provided herein.

Since the wood fiber contains low-molecular-weight C, H and 0 as its constituents, it has lower density than other inorganic materials such as metal products and metal oxides. Therefore, the inventive biomimetic nacre material has higher specific strength and specific toughness than various alloys and composite materials thereof.

3) Exemplary Illustration of Functional Groups

In order to effectively characterize the photocatalytic effect of the inventive biomimetic nacre material, a strip composite material (prepared in Example 11, with a dimension of 20 mm×7 mm×5 mm) is soaked in formaldehyde water solution (0.15 mmol/L) and then exposed to ultraviolet (UV) light.

Figure 7:
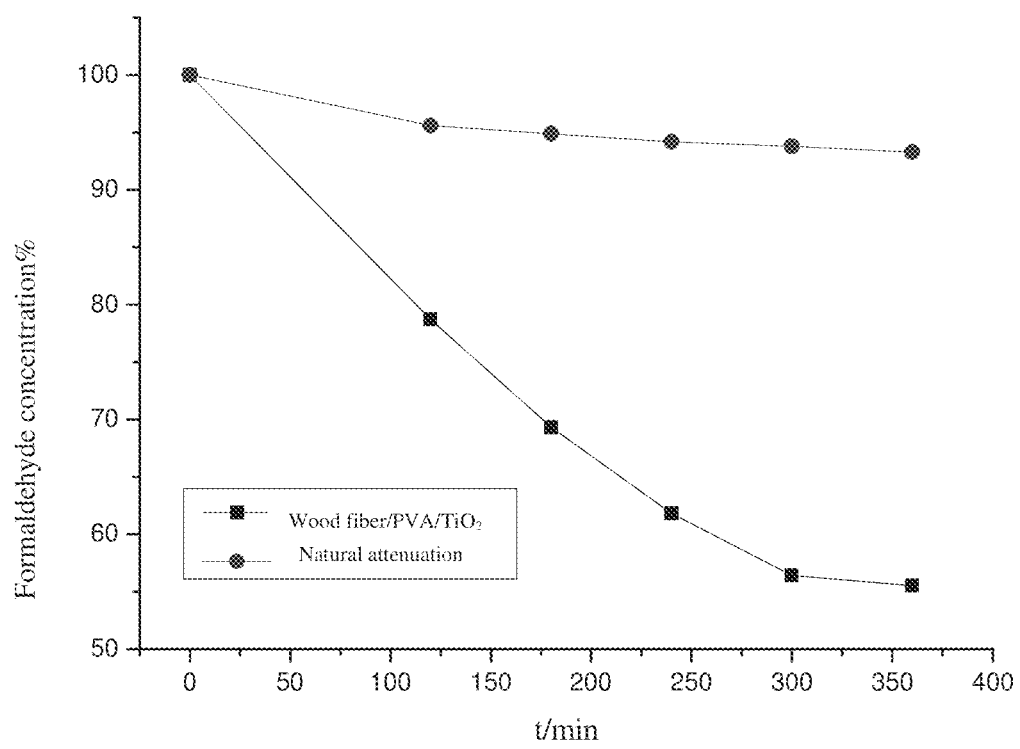
FIG. 7 is a formaldehyde degradation curve of the biomimetic nacre material prepared in Example 11 of the present invention.

FIG. 7 is a formaldehyde degradation curve of the biomimetic nacre material prepared in Example 11 of the present invention. As shown in FIG. 7, from the formaldehyde degradation curve after UV irradiation for 360 min, it can be seen that formaldehyde is gradually degraded over time, the formaldehyde concentration changes little after 300 min, and the biomimetic nacre material has degraded about 44.5% of formaldehyde after 360 min. Such a result shows that the inventive biomimetic nacre material has a remarkable degrading effect on formaldehyde under UV irradiation when using a functional nano inorganic material.

Therefore, the preparation method of the present invention can introduce various functional groups of nanoparticles such as $CaCO_3$, $TiO_2$ and ZnO into a wood material, to endow the inventive biomimetic nacre material with various new functions, e.g. photocatalytic performance, wear resistance, antibacterial performance and magnetism, thereby greatly expanding the application fields of the composite material.

Unless otherwise stated specifically, the numerical values set forth in these examples do not limit the scope of the present invention. In the examples shown and described herein, unless otherwise specified, any specific value should be interpreted as merely exemplary, but not as a limitation, and therefore other examples of exemplary embodiments may have different values.

Finally, it should be noted that the above embodiments are only used to illustrate the technical solutions of the present invention, not to limit them. Although the present invention has been described in detail with reference to the foregoing embodiments, those skilled in the art should understand that modifications can be made on the technical solutions recorded in the foregoing embodiments, or equivalent replacements can be made on some or all of the technical features. These modifications or replacements do not make the essence of the corresponding technical solutions deviate from the scope of the technical solutions of the embodiments of the present invention, and should be covered by the scope of the claims and the specification of the present invention.

What is claimed is:

1. A method for preparing a biomimetic nacre material, comprising the steps of:
   S1: pulverizing biomass fibers, and dissolving in distilled water together with an inorganic nanomaterial to form a nano suspension, and colloid milling at 2,500~3,000 rpm for 5~10 hours, and further treating in a disc mill at 2,500~3,000 rpm for 5~10 hours to obtain a nano-material-wood fiber composite suspension with a particle size of 50~500 nm;
   S2: mixing the nano suspension with mixed salt solution composed of 3.632 g/L NaCl, 0.113 g/L $Na_2SO_4$, 0.332 g/L $NaHCO_3$, 0.328 g/L $MgCl_2.6H_2O$, 0.284 g/L $CaCl_2$ and 0.177 g/L KCl, reacting at 40~60° C. for 36~60 hours to obtain a mineralized nano wood fiber suspension, pre-cooling to 1~5° C., freeze-casting in a liquid nitrogen environment at −196~−30° C., and freeze-drying at −30~20° C. under 10~40 Pa for 12~48 hours to obtain a layered nacre structure-imitating base body; and
   S3: soaking an organic polymer material in the suspension of the layered nacre structure-imitating base body obtained in step S2, and hot pressing at 100~250° C. under 0.8~20 MPa for 0.5~24 hours to obtain a finished product containing the organic polymer material 1~10 mass %, wherein:
   in step S1, a mass ratio of the biomass fibers, the inorganic nanomaterial and the distilled water is 1:(5×10−4~0.2):20.

2. The method in claim 1, wherein the temperature gradually rises during the freeze-drying process in step S2.

3. The method in claim 2, wherein the biomass fibers are one of wood fibers, bamboo fibers, rice straws, wheat straws, corn stalks, cotton stalks, bagasse, reeds and Chinese silver grass.

4. The method in claim 3, wherein the inorganic nanomaterial is selected from one of $CaCO_3$, $TiO_2$, ZnO, Ag, $SiO_2$, $Al_2O_3$, $Fe_3O_4$, $Mg(OH)_2$, $Al(OH)_3$, boron nitride, graphene, graphene oxide, nano montmorillonite, nano flaky calcium phosphate, nano mica sheets, carbon fibers and carbon nanotubes.

5. The method in claim 4, wherein the organic polymer material is selected from one of polyvinyl alcohol, polylactic acid, polyethylene, polypropylene, polyvinyl chloride, p-phenylenediamine, acrylic resin, polyetherimide, chitosan and polyester.

* * * * *